United States Patent
Milne et al.

(10) Patent No.: US 10,075,791 B2
(45) Date of Patent: Sep. 11, 2018

(54) NETWORKED SPEAKER SYSTEM WITH LED-BASED WIRELESS COMMUNICATION AND ROOM MAPPING

(71) Applicant: Sony Corporation, Tokyo (JP)

(72) Inventors: James R. Milne, Ramona, CA (US); Gregory Peter Carlsson, Santee, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/298,470

(22) Filed: Oct. 20, 2016

(65) Prior Publication Data

US 2018/0115825 A1   Apr. 26, 2018

(51) Int. Cl.
| | |
|---|---|
| *H04B 10/116* | (2013.01) |
| *H04R 3/12* | (2006.01) |
| *H04R 29/00* | (2006.01) |
| *H04B 10/50* | (2013.01) |

(52) U.S. Cl.
CPC .............. *H04R 3/12* (2013.01); *H04B 10/116* (2013.01); *H04B 10/502* (2013.01); *H04R 29/002* (2013.01)

(58) Field of Classification Search
CPC .................................................... H04B 10/116
See application file for complete search history.

(56) References Cited

U.S. PATENT DOCUMENTS

| | | | |
|---|---|---|---|
| 6,008,777 A | 12/1999 | Yiu | |
| 7,085,387 B1 | 8/2006 | Metcalf | |
| 7,146,011 B2 | 12/2006 | Yang et al. | |
| 7,191,023 B2 | 3/2007 | Williams | |
| 7,689,613 B2 | 3/2010 | Candelore | |
| 7,792,311 B1 | 9/2010 | Holmgren et al. | |
| 7,822,835 B2 | 10/2010 | Atkinson et al. | |
| 7,853,022 B2 | 12/2010 | Thompson et al. | |
| 8,068,095 B2 | 11/2011 | Pryor | |
| 8,077,873 B2 | 12/2011 | Shridhar et al. | |
| 8,079,055 B2 | 12/2011 | Hardacker et al. | |
| 8,179,755 B2 | 5/2012 | Harris | |

(Continued)

FOREIGN PATENT DOCUMENTS

| | | |
|---|---|---|
| JP | 2005080227 A | 3/2005 |
| JP | 2011004077 A | 1/2011 |

(Continued)

OTHER PUBLICATIONS

Gregory Carlsson, Morio Usami, Peter Shintani, "Ultrasonic Speaker Assembly With Ultrasonic Room Mapping", related U.S. Appl. No. 15/072,098, Non-Final Office Action dated Jan. 4, 2017.

(Continued)

*Primary Examiner* — Nathan Cors
(74) *Attorney, Agent, or Firm* — John L. Rogitz

(57) ABSTRACT

A networked speaker system communicates using Li-Fi. The LEDs implementing the Li-Fi may also have modes in which they are used to map the walls of a room in which the speakers are located, detect the locations of speakers in the room, and detect and classify listeners in the room. Based on this, waveform analysis may be applied to input audio to establish equalization and delays that are optimal for the room geometry, speaker locations, and listener locations.

17 Claims, 12 Drawing Sheets

(56) References Cited

U.S. PATENT DOCUMENTS

| | | |
|---|---|---|
| 8,199,941 B2 | 6/2012 | Hudson et al. |
| 8,296,808 B2 | 10/2012 | Hardacker et al. |
| 8,320,674 B2 | 11/2012 | Guillou et al. |
| 8,345,883 B2 | 1/2013 | Takumai et al. |
| 8,436,758 B2 | 5/2013 | McLaughlin et al. |
| 8,437,432 B2 | 5/2013 | McLaughlin et al. |
| 8,438,589 B2 | 5/2013 | Candelore |
| 8,509,463 B2 | 8/2013 | Goh et al. |
| 8,553,898 B2 | 10/2013 | Raftery |
| 8,614,668 B2 | 12/2013 | Pryor |
| 8,621,498 B2 | 12/2013 | Candelore |
| 8,629,942 B2 | 1/2014 | Candelore |
| 8,677,224 B2 | 3/2014 | McLaughlin et al. |
| 8,760,334 B2 | 6/2014 | McLaughlin et al. |
| 8,811,630 B2 | 8/2014 | Burlingame |
| 9,054,790 B2 | 6/2015 | McLaughlin et al. |
| 9,161,111 B2 | 10/2015 | Yuan et al. |
| 9,282,196 B1 | 3/2016 | Norris et al. |
| 9,485,556 B1* | 11/2016 | List .......... H04R 1/00 |
| 9,607,315 B1* | 3/2017 | Worley, III ........ G06Q 30/0251 |
| 2001/0037499 A1 | 11/2001 | Turock et al. |
| 2002/0054206 A1 | 5/2002 | Allen |
| 2002/0122137 A1 | 9/2002 | Chen et al. |
| 2002/0136414 A1 | 9/2002 | Jordan et al. |
| 2003/0006990 A1* | 1/2003 | Salant ................ G01R 13/0236 345/440.1 |
| 2003/0046685 A1 | 3/2003 | Srinivasan et al. |
| 2003/0107677 A1 | 6/2003 | Lu et al. |
| 2003/0210337 A1 | 11/2003 | Hall |
| 2004/0030425 A1 | 2/2004 | Yeakel et al. |
| 2004/0068752 A1 | 4/2004 | Parker |
| 2004/0178945 A1* | 9/2004 | Buchanan ............ G01S 11/12 342/70 |
| 2004/0196140 A1 | 10/2004 | Sid |
| 2004/0208324 A1 | 10/2004 | Cheung et al. |
| 2004/0264704 A1 | 12/2004 | Huin et al. |
| 2005/0024324 A1 | 2/2005 | Tomasi et al. |
| 2005/0125820 A1 | 6/2005 | Nelson et al. |
| 2005/0177256 A1 | 8/2005 | Shintani et al. |
| 2006/0028545 A1* | 2/2006 | Stapleton ............. G09B 21/001 348/62 |
| 2006/0106620 A1 | 5/2006 | Thompson et al. |
| 2006/0195866 A1 | 8/2006 | Thukral |
| 2006/0285697 A1 | 12/2006 | Nishikawa et al. |
| 2007/0031157 A1* | 2/2007 | Yamada ............. H04B 10/1141 398/198 |
| 2007/0183618 A1 | 8/2007 | Ishii et al. |
| 2007/0211022 A1 | 9/2007 | Boillot |
| 2007/0233293 A1 | 10/2007 | Villemoes et al. |
| 2007/0297519 A1 | 12/2007 | Thompson et al. |
| 2008/0002836 A1 | 1/2008 | Moeller et al. |
| 2008/0025535 A1 | 1/2008 | Rajapakse |
| 2008/0141316 A1 | 6/2008 | Igoe et al. |
| 2008/0175397 A1 | 7/2008 | Holman |
| 2008/0207115 A1 | 8/2008 | Lee et al. |
| 2008/0259222 A1 | 10/2008 | Hardacker et al. |
| 2008/0279307 A1 | 11/2008 | Gaffney et al. |
| 2008/0279453 A1 | 11/2008 | Candelore |
| 2008/0304677 A1 | 12/2008 | Abolfathi et al. |
| 2008/0309914 A1* | 12/2008 | Cantin .................. G01S 17/10 356/4.01 |
| 2008/0313670 A1 | 12/2008 | Ho et al. |
| 2009/0037951 A1 | 2/2009 | Candelore et al. |
| 2009/0041418 A1 | 2/2009 | Candelore et al. |
| 2009/0060204 A1 | 3/2009 | Reams et al. |
| 2009/0150569 A1 | 6/2009 | Kumar et al. |
| 2009/0172744 A1 | 7/2009 | Rothschild |
| 2009/0228285 A1 | 9/2009 | Schnell et al. |
| 2009/0252338 A1 | 10/2009 | Koppens et al. |
| 2009/0313675 A1 | 12/2009 | Howarter et al. |
| 2010/0220864 A1 | 9/2010 | Martin |
| 2010/0260348 A1 | 10/2010 | Bhow et al. |
| 2011/0091055 A1 | 4/2011 | LeBlanc |
| 2011/0103592 A1 | 5/2011 | Kim et al. |
| 2011/0157467 A1 | 6/2011 | McRae |
| 2011/0270428 A1 | 11/2011 | Tam |
| 2012/0011550 A1 | 1/2012 | Holland |
| 2012/0014524 A1 | 1/2012 | Vafiadis |
| 2012/0039477 A1 | 2/2012 | Schijers et al. |
| 2012/0058727 A1 | 3/2012 | Cook et al. |
| 2012/0069868 A1 | 3/2012 | McLaughlin et al. |
| 2012/0114151 A1 | 5/2012 | Nguyen et al. |
| 2012/0117502 A1 | 5/2012 | Nguyen et al. |
| 2012/0120874 A1 | 5/2012 | McLaughlin et al. |
| 2012/0148075 A1 | 6/2012 | Goh et al. |
| 2012/0158972 A1 | 6/2012 | Gammill et al. |
| 2012/0174155 A1 | 7/2012 | Mowrey et al. |
| 2012/0207307 A1 | 8/2012 | Engdegard et al. |
| 2012/0220224 A1 | 8/2012 | Walker |
| 2012/0254931 A1 | 10/2012 | Oztaskent et al. |
| 2012/0291072 A1 | 11/2012 | Maddison et al. |
| 2012/0314872 A1 | 12/2012 | Tan et al. |
| 2012/0320278 A1 | 12/2012 | Yoshitani et al. |
| 2013/0003822 A1 | 1/2013 | Margulis |
| 2013/0039514 A1 | 2/2013 | Knowles et al. |
| 2013/0042292 A1 | 2/2013 | Buff et al. |
| 2013/0051572 A1 | 2/2013 | Goh et al. |
| 2013/0052997 A1 | 2/2013 | Killick et al. |
| 2013/0055323 A1 | 2/2013 | Venkitaraman et al. |
| 2013/0077803 A1 | 3/2013 | Konno et al. |
| 2013/0109371 A1 | 5/2013 | Brogan et al. |
| 2013/0121515 A1 | 5/2013 | Hooley et al. |
| 2013/0156212 A1 | 6/2013 | Bjelosevic et al. |
| 2013/0191753 A1 | 7/2013 | Sugiyama et al. |
| 2013/0205319 A1 | 8/2013 | Sinha et al. |
| 2013/0210353 A1 | 8/2013 | Ling et al. |
| 2013/0223279 A1 | 8/2013 | Tinnakomsrisuphap et al. |
| 2013/0229577 A1 | 9/2013 | McRae |
| 2013/0237156 A1 | 9/2013 | Jung et al. |
| 2013/0238538 A1 | 9/2013 | Cook et al. |
| 2013/0249791 A1 | 9/2013 | Pryor |
| 2013/0272527 A1 | 10/2013 | Oomen et al. |
| 2013/0272535 A1 | 10/2013 | Yuan et al. |
| 2013/0298179 A1 | 11/2013 | Baum et al. |
| 2013/0305152 A1 | 11/2013 | Griffiths et al. |
| 2013/0309971 A1 | 11/2013 | Kiukkonen et al. |
| 2013/0310064 A1 | 11/2013 | Brachet et al. |
| 2013/0312018 A1 | 11/2013 | Elliott et al. |
| 2013/0317905 A1 | 11/2013 | Warner et al. |
| 2013/0321268 A1 | 12/2013 | Tuck et al. |
| 2013/0325396 A1 | 12/2013 | Yuen et al. |
| 2013/0325954 A1 | 12/2013 | Cupala et al. |
| 2013/0326552 A1 | 12/2013 | Adams |
| 2013/0332957 A1 | 12/2013 | DeWeese et al. |
| 2014/0003623 A1 | 1/2014 | Lang |
| 2014/0003625 A1 | 1/2014 | Sheen et al. |
| 2014/0004934 A1 | 1/2014 | Peterson et al. |
| 2014/0009476 A1 | 1/2014 | Venkitaraman et al. |
| 2014/0011448 A1 | 1/2014 | Yang |
| 2014/0026193 A1 | 1/2014 | Saxman et al. |
| 2014/0064492 A1 | 3/2014 | Lakkundi et al. |
| 2014/0219483 A1 | 8/2014 | Hong |
| 2014/0254811 A1 | 9/2014 | Takeda et al. |
| 2014/0287806 A1 | 9/2014 | Balachandreswaran |
| 2014/0297296 A1 | 10/2014 | Koppens et al. |
| 2014/0362995 A1 | 12/2014 | Backman et al. |
| 2015/0078595 A1 | 3/2015 | Shintani et al. |
| 2015/0104026 A1 | 4/2015 | Kappus et al. |
| 2015/0201295 A1 | 7/2015 | Lau et al. |
| 2015/0208187 A1 | 7/2015 | Carlsson et al. |
| 2015/0208190 A1 | 7/2015 | Hooks et al. |
| 2015/0215723 A1 | 7/2015 | Carlsson et al. |
| 2015/0228262 A1 | 8/2015 | Silfvast et al. |
| 2015/0271620 A1 | 9/2015 | Lando et al. |
| 2015/0304789 A1 | 10/2015 | Babayoff et al. |
| 2015/0341737 A1 | 11/2015 | Kallai et al. |
| 2015/0350804 A1 | 12/2015 | Crockett et al. |
| 2015/0358707 A1 | 12/2015 | Saijo et al. |

(56) References Cited

U.S. PATENT DOCUMENTS

2016/0327637 A1* 11/2016 Gazit ............... G01S 17/10
2017/0125647 A1* 5/2017 Park ............... H01L 33/30

FOREIGN PATENT DOCUMENTS

WO      2009002292 A1    12/2008
WO      2012164444 A1    12/2012

OTHER PUBLICATIONS

Gregory Carlsson, Morio Usami, Peter Shintani, "Ultrasonic Speaker Assembly With Ultrasonic Room Mapping", related U.S. Appl. No. 15/072,098, Applicant's response to Non-Final Office Action filed Jan. 9, 2017.

James R. Milne, Gregory Carlsson, "Centralized Wireless Speaker System", related U.S. Appl. No. 15/019,111, Non-Final Office Action dated Jan. 20, 2017.

James R. Milne, Gregory Carlsson, "Centralized Wireless Speaker System", related U.S. Appl. No. 15/019,111, Applicant's response to Non-Final Office Action filed Jan. 25, 2017.

James R. Milne, Gregory Carlsson, "Centralized Wireless Speaker System", related U.S. Appl. No. 15/019,111, Applicant's response to Non-Final Office Action filed May 11, 2017.

James R. Milne, Gregory Carlsson, "Centralized Wireless Speaker System", related U.S. Appl. No. 15/019,111, Final Office Action dated Jun. 9, 2017.

Ames R. Milne, Gregory Carlsson, "Centralized Wireless Speaker System", related U.S. Appl. No. 15/019,111, Applicant's response to Final Office Action filed Jun. 16, 2017.

"Ack Pro Mid-Sized Ball Bearing Brushless Gimbal With Turnigy 4008 Motors", Hobbyking.com, Retrieved on Nov. 27, 2015 from http://www.hobbyking/store/_51513_ACK_Pro_Mid_Sized_Ball_Bearing_Brushless_Gimbal_With_Turnigy_4008_Motors_NEX5_and_GF.html.

"Method and System for Discovery and Configuration of Wi-Fi Speakers", http://ip.com/IPCOM/000220175; Dec. 31, 2008.

Frieder Ganz, Payam Barnaghi, Francois Carrez, Klaus Moessner, "Context-Aware Management for Sensor Networks", University of Surrey, Guildford, UK Publication, 2011.

Madoka Nakajima, Shinichiro Haruyama, "New indoor navigation system for visually impaired people using visible light communication", Eurasip Journal on Wireless Communications and Networking, Feb. 19, 2013.

Patrick Lazik, Niranjini Rajagopal, Oliver Shih, Bruno Sinopoli, Anthony Rowe, "ALPS: A Bluetooth and Ultrasound Platform for Mapping and Localization", Dec. 4, 2015, Carnegie Mellon University.

Robert W. Reams, "N-Channel Rendering: Workable 3-D Audio for 4kTV", AES 135, New York City, 2013.

Santiago Elvira, Angel De Castro, Javier Garrido, "ALO4: Angle Localization and Orientation System with Four Receivers", Jun. 27, 2014, International Journal of Advanced Robotic Systems.

Sokratis Kartakis, Margherita Antona, Constantine Stephandis, "Control Smart Homes Easily with Simple Touch", University of Crete, Crete, GR, 2011.

Tianxing Li, Chuankai An, Zhao Tian, Andrew T. Campbell, Xia Zhou, "Human Sensing Using Visible Light Communication", Department of Computer Science, Dartmouth College, Hanover, NH, Sep. 2015.

Woon-Seng Gan, Ee-Leng Tan, Sen M. Kuo, "Audio Projection: Directional Sound and Its Applications in Immersive Communication", 2011, IEE Signal Processing Magazine, 28(1), 43-57.

James R. Milne, Gregory Carlsson, "Centralized Wireless Speaker System", file history of related U.S. Appl. No. 15/019,111, filed Feb. 9, 2016.

Gregory Carlsson, Morio Usami, Peter Shintani, "Ultrasonic Speaker Assembly with Ultrasonic Room Mapping", file history of related U.S. Appl. No. 15/072,098, filed Mar. 16, 2016.

James R. Milne, Gregory Peter Carlsson, "Networked Speaker System with LED-Based Wireless Communication and Object Detection", file history of related U.S. Appl. No. 15/298,591, filed Oct. 20, 2016.

James R. Milne, Gregory Peter Carlsson, "Networked Speaker System with LED-Based Wireless Communication and Personal Identifier", file history of related U.S. Appl. No. 15/298,649, filed Oct. 20, 2016.

James R. Milne, Gregory Carlsson, "Centralized Wireless Speaker System", related U.S. Appl. No. 15/019,111, Non-Final Office Action dated Apr. 21, 2017.

James R. Milne, Gregory Peter Carlsson, "Networked Speaker System with LED-Based Wireless Communication and Object Detection", related U.S. Appl. No. 15/298,591, Final Office Action dated Sep. 14, 2017.

James R. Milne, Gregory Peter Carlsson, "Networked Speaker System with LED-Based Wireless Communication and Object Detection", related U.S. Appl. No. 15/298,591, Applicant's response to Final Office Action filed Sep. 18, 2017.

James R. Milne, Gregory Peter Carlsson, "Networked Speaker System with LED-Based Wireless Communication and Personal Identifier", related U.S. Appl. No. 15/298,649, Final Office Action dated Sep. 15, 2017.

James R. Milne, Gregory Peter Carlsson, "Networked Speaker System with LED-Based Wireless Communication and Personal Identifier", related U.S. Appl. No. 15/298,649, Applicant's response to Final Office Action filed Sep. 18, 2017.

James R. Milne, Gregory Peter Carlsson, "Networked Speaker System with LED-Based Wireless Communication and Object Detection", related U.S. Appl. No. 15/298,591, Non-Final Office Action dated Jun. 29, 2017.

James R. Milne, Gregory Peter Carlsson, "Networked Speaker System with LED-Based Wireless Communication and Object Detection", related U.S. Appl. No. 15/298,591, Applicant's response to Non-Final Office Action filed Jul. 11, 2017.

James R. Milne, Gregory Peter Carlsson, "Networked Speaker System with LED-Based Wireless Communication and Personal Identifier", related U.S. Appl. No. 15/298,649, Non-Final Office Action dated Jun. 29, 2017.

James R. Milne, Gregory Peter Carlsson, "Networked Speaker System with LED-Based Wireless Communication and Personal Identifier", related U.S. Appl. No. 15/298,649, Applicant's response to Non-Final Office Action filed Jul. 11, 2017.

James R. Milne, Gregory Peter Carlsson, "Networked Speaker System with LED-Based Wireless Communication and Personal Identifier", related U.S. Appl. No. 15/298,649, Non-Final Office Action dated Oct. 3, 2017.

James R. Milne, Gregory Peter Carlsson, "Networked Speaker System with LED-Based Wireless Communication and Personal Identifier", related U.S. Appl. No. 15/298,649, Applicant's response to Non-Final Office Action filed Oct. 16, 2017.

James R. Milne, Gregory Peter Carlsson, "Networked Speaker System with LED-Based Wireless Communication and Personal Identifier", related U.S. Appl. No. 15/298,649, Final Office Action dated Dec. 21, 2017.

James R. Milne, Gregory Peter Carlsson, "Networked Speaker System with LED-Based Wireless Communication and Personal Identifier", related U.S. Appl. No. 15/298,649, Applicant's response to Final Office Action filed Dec. 22, 2017.

* cited by examiner

FIG. 1 Networked-Speaker Block Diagram

NETWORKED SPEAKER SYSTEM WITH LED-BASED WIRELESS COMMUNICATION AND ROOM MAPPING

FIELD

The present application relates generally to networked speaker systems with LED-based wireless communication and room mapping.

BACKGROUND

People who enjoy high quality sound, for example in home entertainment systems, prefer to use multiple speakers for providing stereo, surround sound, and other high fidelity sound.

SUMMARY

As understood herein, optimizing speaker settings for the particular room and speaker location in that room does not lend itself to easy accomplishment by non-technical users. As further understood herein, a single LED-based communication system such as Li-Fi can be used for multiple purposes, including communication, determining room boundaries, locating audio speakers and listeners in the room, and determining the identities of listeners in the room to better optimize sound for those listeners.

A device includes at least one computer medium that is not a transitory signal and that in turn includes instructions executable by at least one processor to control at least a first light emitting diode (LED) associated with at least a first audio speaker to communicate with at least a second audio speaker using Li-Fi communication. The instructions are also executable to control the first LED to emit a detection signal not for communication and detectable by at least one receiver for determining a location of at least one point on at least one wall of an enclosure in which the first audio speaker is located.

The device may be integral to the first speaker, or the device may be disposed in a module separate from the first speaker and associable with the first speaker. The device can include the processor and/or the first LED and/or the receiver.

The instructions may be further executable to determine plural time differences between respective times of receipt of plural received returns from respective return locations of respective detection signals, and respective transmission times of the respective detection signals. The instructions in this case may be executable to correlate the plural time differences to corresponding distances, and to output a wall location based on at least some of the plural distances indicating return locations lying in a common plane. The instructions also may be executable to, based at least in part on the wall location, establish at least one setting of at least one of the audio speakers.

In another aspect, a method includes using at least a first light emitter to communicate with a receiver using Li-Fi, and also using the first light emitter to detect at least a first wall in an enclosure in which the light emitter is located.

In another aspect, a system includes plural audio speakers, at least some of which are associated with respective Li-Fi assemblies for communicating data between at least some of the audio speakers. The system also includes at least one processor configured for determining, using reflections of signals from at least a first one of the Li-Fi assemblies, a location of at least one wall of an enclosure in which at least some of the audio speakers are located. The processor is also configured for, based at least in part on the location of the at least one wall, establishing at least one setting of at least one of the audio speakers.

The details of the present application, both as to its structure and operation, can be best understood in reference to the accompanying drawings, in which like reference numerals refer to like parts, and in which:

DETAILED DESCRIPTION

Figure 1:
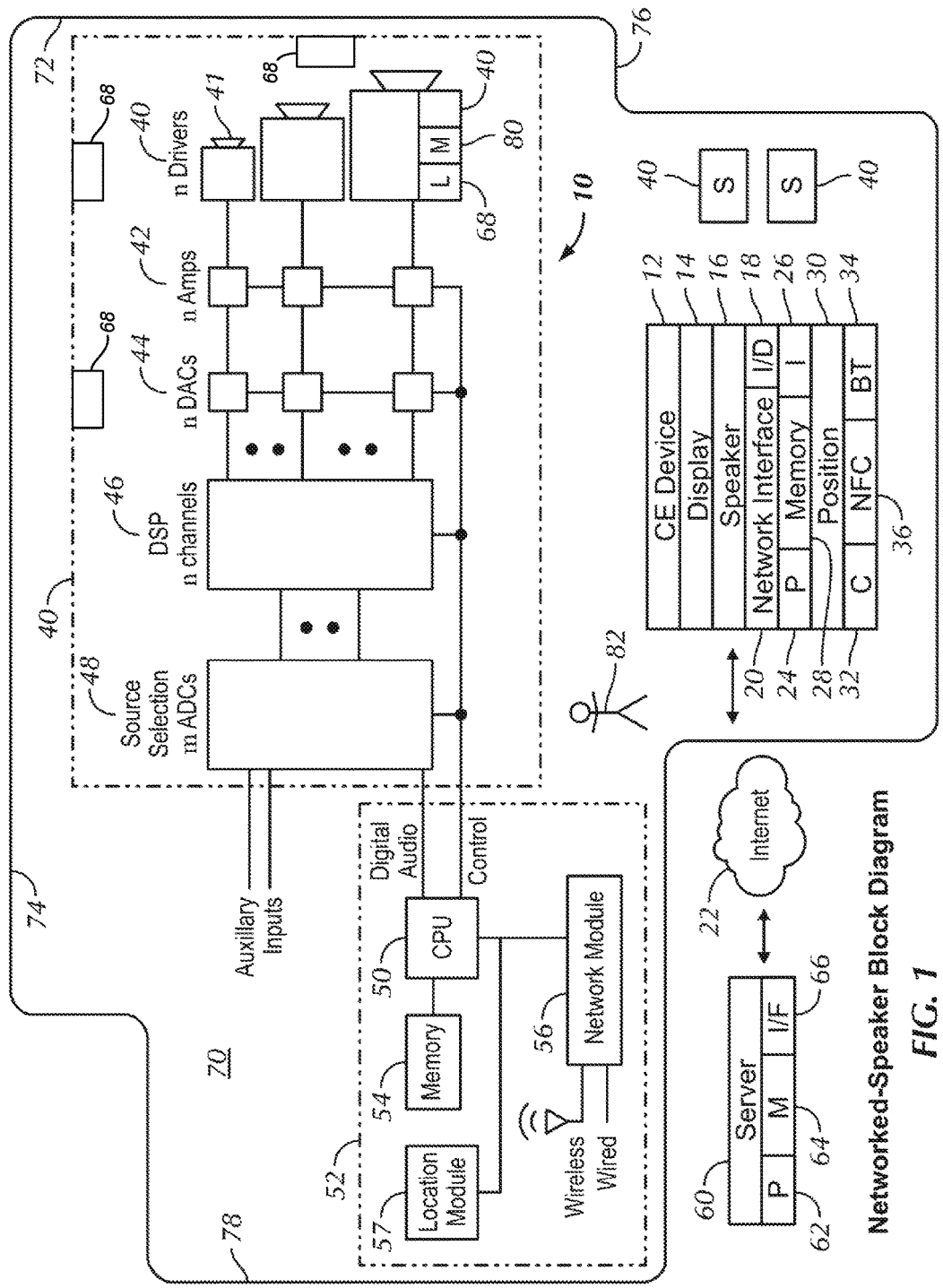
FIG. 1 is a block diagram of an example centralized system.

The present assignee's U.S. patent publication no. 2015/0208187 is incorporated herein by reference. Also incorporated herein by reference are the present assignee's U.S. patent applications Ser. Nos. 15/019,111 and 15/072,098.

Also, in addition to the instant disclosure, further details may use Decawave's ultra wide band (UWB) techniques disclosed in one or more of the following location determination documents, all of which are incorporated herein by reference: U.S. Pat. Nos. 9,054,790; 8,870,334; 8,677,224; 8,437,432; 8,436,758; and USPPs 2008/0279307; 2012/0069868; 2012/0120874. In addition to the instant disclosure, further details on aspects of the below-described rendering including up-mixing and down rendering may use the techniques in any one or more of the following rendering documents, all of which are incorporated herein by reference: U.S. Pat. Nos. 7,929,708; 7,853,022; USPP 2007/0297519; USPP 2009/0060204; USPP 2006/0106620; and Reams, "N-Channel Rendering: Workable 3-D Audio for 4kTV", AES 135 White paper, New York City 2013.

This disclosure relates generally to computer ecosystems including aspects of multiple audio speaker ecosystems. A system herein may include server and client components, connected over a network such that data may be exchanged between the client and server components. The client components may include one or more computing devices that have audio speakers including audio speaker assemblies per se but also including speaker-bearing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12. The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is configured to undertake present principles (e.g. communicate with other devices to undertake present principles, execute the logic described herein, and perform any other functions and/or operations described herein).

Accordingly, to undertake such principles the CE device 12 can be established by some or all of the components shown in FIG. 1. For example, the CE device 12 can include one or more touch-enabled displays 14, one or more speakers 16 for outputting audio in accordance with present principles, and at least one additional input device 18 such as e.g. an audio receiver/microphone for e.g. entering audible commands to the CE device 12 to control the CE device 12. The example CE device 12 may also include one or more network interfaces 20 for communication over at least one network 22 such as the Internet, an WAN, an LAN, etc. under control of one or more processors 24. It is to be understood that the processor 24 controls the CE device 12 to undertake present principles, including the other elements of the CE device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 26 such as, e.g., a USB port to physically connect (e.g. using a wired connection) to another CE device and/or a headphone port to connect headphones to the CE device 12 for presentation of audio from the CE device 12 to a user through the headphones. The CE device 12 may further include one or more computer memories 28 such as disk-based or solid state storage that are not transitory signals. Also in some embodiments, the CE device 12 can include a position or location receiver such as but not limited to a GPS receiver and/or altimeter 30 that is configured to e.g. receive geographic position information from at least one satellite and provide the information to the processor 24 and/or determine an altitude at which the CE device 12 is disposed in conjunction with the processor 24. However, it is to be understood that another suitable position receiver other than a GPS receiver and/or altimeter may be used in accordance with present principles to e.g. determine the location of the CE device 12 in e.g. all three dimensions.

Continuing the description of the CE device 12, in some embodiments the CE device 12 may include one or more cameras 32 that may be, e.g., a thermal imaging camera, a digital camera such as a webcam, and/or a camera integrated into the CE device 12 and controllable by the processor 24 to gather pictures/images and/or video in accordance with present principles. Also included on the CE device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the CE device 12 may include one or more motion sensors (e.g., an accelerometer, gyroscope, cyclometer, magnetic sensor, infrared (IR) motion sensors such as passive IR sensors, an optical sensor, a speed and/or cadence sensor, a gesture sensor (e.g. for sensing gesture command), etc.) providing input to the processor 24. The CE device 12 may include still other sensors such as e.g. one or more climate sensors (e.g. barometers, humidity sensors, wind sensors, light sensors, temperature sensors, etc.) and/or one or more biometric sensors providing input to the processor 24. In addition to the foregoing, it is noted that in some embodiments the CE device 12 may also include a kinetic energy harvester to e.g. charge a battery (not shown) powering the CE device 12.

In some examples, the CE device 12 may function in connection with the below-described "master" or the CE device 12 itself may establish a "master". A "master" is used to control multiple ("n", wherein "n" is an integer greater than one) speakers 40 in respective speaker housings, each of can have multiple drivers 41, with each driver 41 receiving signals from a respective amplifier 42 over wired and/or wireless links to transduce the signal into sound (the details of only a single speaker shown in FIG. 1, it being understood that the other speakers 40 may be similarly constructed). Each amplifier 42 may receive over wired and/or wireless links an analog signal that has been converted from a digital signal by a respective standalone or integral (with the amplifier) digital to analog converter (DAC) 44. The DACs 44 may receive, over respective wired and/or wireless channels, digital signals from a digital signal processor (DSP) 46 or other processing circuit.

The DSP 46 may receive source selection signals over wired and/or wireless links from plural analog to digital converters (ADC) 48, which may in turn receive appropriate auxiliary signals and, from a control processor 50 of a master control device 52, digital audio signals over wired and/or wireless links. The control processor 50 may access a computer memory 54 such as any of those described above and may also access a network module 56 to permit wired and/or wireless communication with, e.g., the Internet. The control processor 50 may also access a location module 57. The location module 57 may be implemented by a UWB module made by Decawave or it may be implemented using the Li-Fi principles discussed herein. One or more of the speakers 40 may also have respective location modules attached or otherwise associated with them. As an example, the master device 52 may be implemented by an audio video (AV) receiver or by a digital pre-amp processor (pre-pro).

As shown in FIG. 1, the control processor 50 may also communicate with each of the ADCs 48, DSP 46, DACs 44, and amplifiers 42 over wired and/or wireless links. In any case, each speaker 40 can be separately addressed over a network from the other speakers.

More particularly, in some embodiments, each speaker 40 may be associated with a respective network address such as but not limited to a respective media access control (MAC) address. Thus, each speaker may be separately addressed over a network such as the Internet. Wired and/or wireless communication links may be established between the speakers 40/CPU 50, CE device 12, and server 60, with the CE device 12 and/or server 60 being thus able to address individual speakers, in some examples through the CPU 50 and/or through the DSP 46 and/or through individual processing units associated with each individual speaker 40, as may be mounted integrally in the same housing as each individual speaker 40.

The CE device 12 and/or control device 52 of each individual speaker train (speaker+amplifier+DAC+DSP, for instance) may communicate over wired and/or wireless links with the Internet 22 and through the Internet 22 with one or more network servers 60. Only a single server 60 is shown in FIG. 1. A server 60 may include at least one processor 62, at least one tangible computer readable storage medium 64 such as disk-based or solid state storage, and at least one network interface 66 that, under control of the processor 62, allows for communication with the other devices of FIG. 1 over the network 22, and indeed may facilitate communication between servers and client devices in accordance with present principles. Note that the network interface 66 may be, e.g., a wired or wireless modem or router, Wi-Fi transceiver, Li-Fi transceiver, or other appropriate interface such as, e.g., a wireless telephony transceiver.

Accordingly, in some embodiments the server 60 may be an Internet server, may include and perform "cloud" functions such that the devices of the system 10 may access a "cloud" environment via the server 60 in example embodiments. In a specific example, the server 60 downloads a software application to the master and/or the CE device 12 for control of the speakers 40 according to logic below. The master/CE device 12 in turn can receive certain information from the speakers 40, such as their location from a real time location system (RTLS) such as but not limited to GPS or the below-described Li-Fi, and/or the master/CE device 12 can receive input from the user, e.g., indicating the locations of the speakers 40 as further disclosed below. Based on these inputs at least in part, the master/CE device 12 may execute the speaker optimization logic discussed below, or it may upload the inputs to a cloud server 60 for processing of the optimization algorithms and return of optimization outputs to the CE device 12 for presentation thereof on the CE device 12, and/or the cloud server 60 may establish speaker configurations automatically by directly communicating with the speakers 40 via their respective addresses, in some cases through the CE device 12. Note that if desired, each speaker 40 may include one or more respective one or more light emitting diode (LED) assemblies 68 implementing Li-Fi communication to establish short-range wireless communication among the networked speakers shown. Also, the remote control of the user, e.g., the CE device 12, may include one or more LED assemblies. Additional LED assemblies 68 for the various purposes described herein may be mounted in and around an enclosure 70 as shown. Example LED arrangements are discussed further below. An LED assembly 68 may include both LEDs and light receivers such as photodiodes, along with appropriate control circuitry.

As shown, the speakers 40 are disposed in the enclosure 70 such as a room, e.g., a living room. For purposes of disclosure, the enclosure 70 has (with respect to the example orientation of the speakers shown in FIG. 1) a front wall 72, left and right side walls 74, 76, and a rear wall 78. One or more listeners 82 may occupy the enclosure 70 to listen to audio from the speakers 40. One or microphones 80 may be arranged in the enclosure for generating signals representative of sound in the enclosure 70, sending those signals via wired and/or wireless links to the CPU 50 and/or the CE device 12 and/or the server 60. In the non-limiting example shown, each speaker 40 supports a microphone 80, it being understood that the one or more microphones may be arranged elsewhere in the system if desired.

Disclosure below may make determinations using sonic wave calculations known in the art, in which the acoustic waves frequencies (and their harmonics) from each speaker, given its role as a bass speaker, a treble speaker, a subwoofer speaker, or other speaker characterized by having assigned to it a particular frequency band, are computationally modeled in the enclosure 70 and the locations of constructive and destructive wave interference determined based on where the speaker is and where the walls 72-78 are. As mentioned above, the computations may be executed, e.g., by the CE device 12 and/or by the cloud server 60 and/or master 52.

As an example, a speaker may emit a band of frequencies between 20 Hz and 30 Hz, and frequencies (with their harmonics) of 20 Hz, 25 Hz, and 30 Hz may be modeled to propagate in the enclosure 70 with constructive and destructive interference locations noted and recorded. The wave interference patterns of other speakers based on the modeled expected frequency assignments and the locations in the enclosure 70 of those other speakers may be similarly computationally modeled together to render an acoustic model for a particular speaker system physical layout in the enclosure 70 with a particular speaker frequency assignations. In some embodiments, reflection of sound waves from one or more of the walls may be accounted for in determining wave interference. In other embodiments reflection of sound waves from one or more of the walls may not be accounted for in determining wave interference. The acoustic model based on wave interference computations may furthermore account for particular speaker parameters such as but not limited to equalization (EQ). The parameters may also include delays, i.e., sound track delays between speakers, which result in respective wave propagation delays relative to the waves from other speakers, which delays may also be accounted for in the modeling. A sound track delay refers to the temporal delay between emitting, using respective speakers, parallel parts of the same soundtrack, which temporally shifts the waveform pattern of the corresponding speaker. The parameters can also include volume, which defines the amplitude of the waves from a particular speaker and thus the magnitude of constructive and destructive interferences in the waveform. Collectively, a combination of speaker location, frequency assignment, and parameters may be considered to be a "configuration". A configuration may be established to optimize, according to a desired, potentially empirically-determined standard of optimization, acoustic wave constructive and destructive interference for a particular location in the enclosure 70 given the locations of the walls and the various frequencies to be assigned to the various speakers. The particular location(s) may be the expected or actual location of one or more listener, and the EQs, frequency assignments, and delays of the various speakers may be further tailored to the desires or traits of specific individual listeners based on listener profiles.

Figure 2:
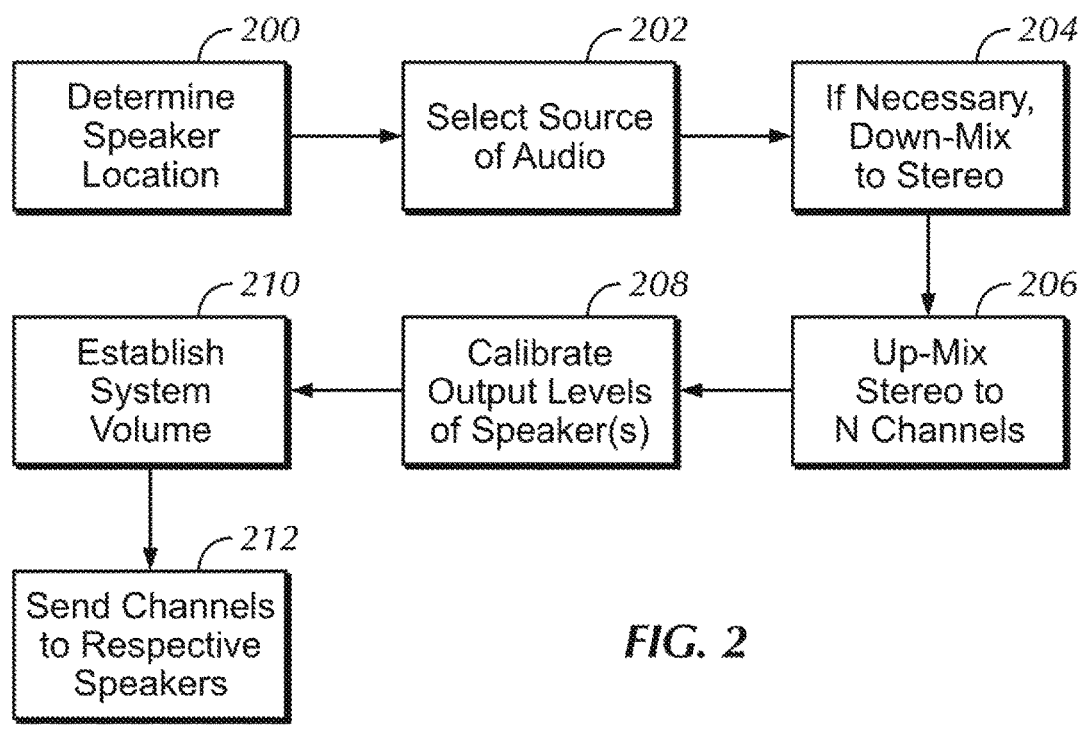
FIG. 2 is a flow chart of example overall logic pertaining to the centralized system in FIG. 1.

The configuration shown in FIG. 1 has a centralized control architecture in which the master device 52 or CE device 12 or other device functioning as a master renders two channel audio into as many channels are there are speakers in the system, providing each respective speaker with its channel. The rendering, which produces more channels than stereo and hence may be considered "up-mixing", may be executed using principles described in the above-referenced rendering references. FIG. 2 describes the overall logic flow that may be implemented using the centralized architecture of FIG. 1, in which most if not all of the logic is executed by the master device.

The logic shown in FIG. 2 may be executed by one or more of the CPU 50, the CE device 12 processor 24, and the server 60 processor 62. The logic may be executed at application boot time when a user, e.g. by means of the CE device 12, launches a control application, which prompts the user to energize the speaker system to energize the speakers 40.

Commencing at block 200, the processor(s) of the master determines room dimension, the location of each speaker in the system, and number of speakers in the room, and the location and if desired identities of each listener in the room. This process is described further below. Moving to block 202, the master selects the source of audio to be played. This may be done responsive to user command input using, e.g., the device 12.

If the input audio is not two channel stereo, but instead is, e.g., seven channel audio plus a subwoofer channel (denoted "7.1 audio"), at block 204 the input audio may be down-mixed to stereo (two channel). The down-mixing may be executed using principles described in the above-referenced rendering references. Other standards for down-mixing may be used, e.g., ITU-R BS.775-3 or Recommendation 7785. Then, proceeding to block 206 the stereo audio (whether received in stereo or down-mixed) can be up-mixed to render "N" channels, where "N" is the number of speakers in the system. Audio can be rendered for each speaker channel based on the respective speaker location (i.e., perimeter, aerial, sub in the x, y, z domain). The up-mixing can be based on the current speaker locations as will be explained further shortly.

Moving to block 208, the channel/speaker output levels are calibrated per description below, preferably based on primary listener location, and then at block 210 system volume is established based on, e.g., room dimensions, number and location of speakers, etc. The user may adjust this volume. At block 212 the master sends the respective audio channels to the respective speakers.

Thus, it may now be appreciated that the speakers 40 do not have to be in a predefined configuration to support a specific audio configuration such as 5.1 or 7.1 and do not have to be disposed in the pre-defined locations of such audio configurations, because the input audio is down-mixed to stereo and then up-mixed into the appropriate number of channels for the actual locations and number of speakers.

Figure 3:
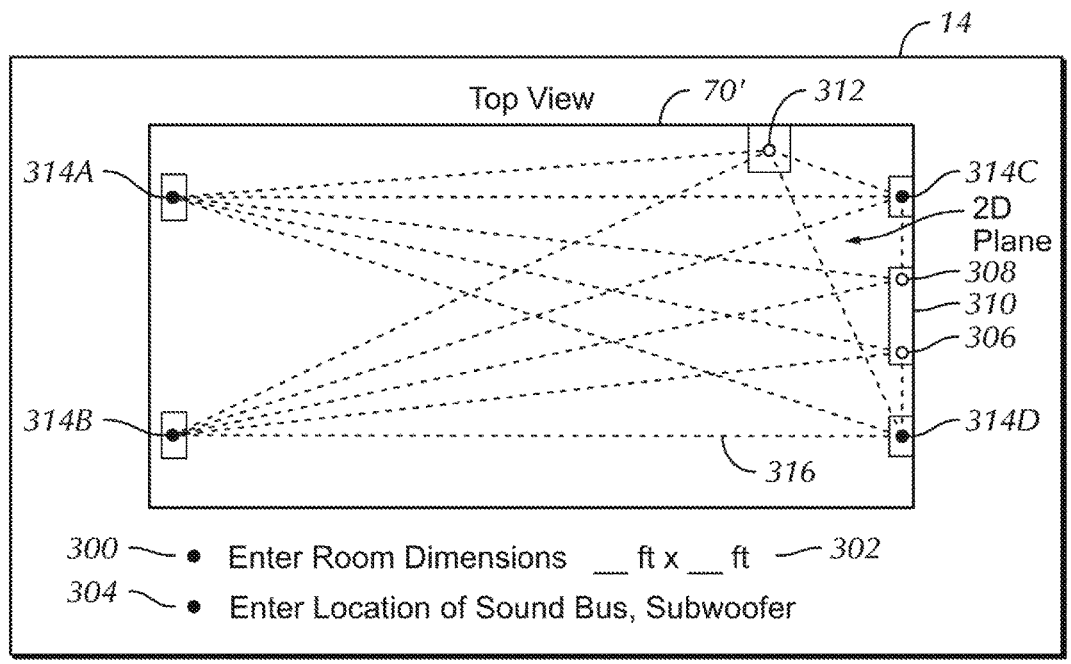
FIG. 3 is a screen shot of an example user interface (UI) that may be presented on a consumer electronics (CE) device to set up speaker location determination.

FIG. 3 illustrates an embodiment in which the dimensions of the enclosure 70 are manually entered by the user, it being understood that automatic means of effecting the same outcome are set forth further below.

Figure 4:
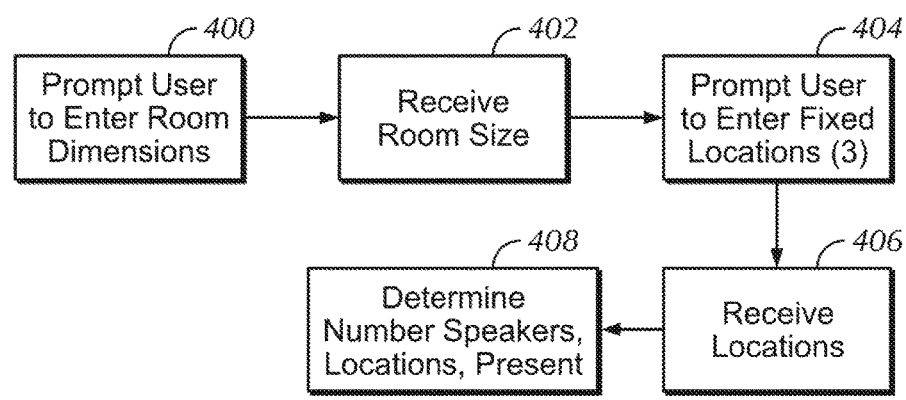
FIG. 4 is a flow chart of example logic for determining speaker locations in a room.

A user interface (UI) may be presented, e.g., on the display 14 of the CE device 12, pursuant to the logic in block 200 of FIG. 2, in the case in which speaker location determination is intended for two dimensions only (in the x-y, or horizontal, plane). FIG. 4 illustrates aspects of logic that may be used with FIG. 3. An application (e.g., via Android, iOS, or URL) can be provided to the customer for use on the CE device 12.

As shown at 300 in FIG. 3 and at block 400 in FIG. 4, the user can be prompted to enter the dimensions of the room 70, an outline 70' of which may be presented on the CE device as shown once the user has entered the dimensions. The dimensions may be entered alpha-numerically, e.g., "15 feet by 20 feet" as at 302 in FIG. 3 and/or by dragging and dropping the lines of an initial outline 70' to conform to the size and shape of the room 70. The application presenting the UI of FIG. 3 may provide a reference origin, e.g., the southwest corner of the room. The room size is received from the user input at block 402 of FIG. 4.

In other embodiments discussed further below, room size and shape can be determined automatically. This can be done by sending measurement waves (such as Li-Fi transmissions from the LEDs) from an appropriate transceiver on the CE device 12 and detecting returned reflections from the walls of the room 70, determining the distances between transmitted and received waves to be one half the time between transmission and reception times the speed of the relevant wave. Or, it may be executed using other principles such as imaging the walls and then using image recognition principles to convert the images into an electronic map of the room.

Moving to block 404, the user may be prompted as at 304 to enter onto the UI of FIG. 3 at least three fixed locations, in one example, the left and right ends 306, 308 of a sound bar or TV 310 and the location at which the user has disposed the audio system subwoofer 312. Four fixed locations are entered for 3D rendering determinations. Entry may be effected by touching the display 14 at the locations in the outline 70' corresponding to the requested components. In a Li-Fi implementation, each fixed location may be associated with a respective Li-Fi LED 68 shown in FIG. 1 and discussed further below. The locations are received at block 406 in FIG. 4. The user may also directly input the fact that, for instance, the sound bar is against a wall, so that rendering calculations can ignore mathematically possible calculations in the region behind the wall.

Note that only speakers determined to be in the same room may be considered. Other speakers in other rooms can be ignored. When determining the speaker locations, it may first be decided if a 2D or 3D approach is to be used. This may be done by knowing how many known of fixed locations have been entered. Three known locations yields a 2D approach (all speakers are more or less residing in a single plane). Four known locations yields a 3D approach. Note further that the distance between the two fixed sound bar (or TV) locations may be known by the manufacturer and input to the processor automatically as soon as the user indicated a single location for the sound bar. In some embodiments, the subwoofer location can be input by the user by entering the distance from the sound bar to the subwoofer. Moreover, if a TV is used for two of the fixed locations, the TV may have two locators mounted on it with a predetermined distance between the locators stored in memory, similar to the sound bar. Yet again, standalone location markers such as LEDs or UWB tags can be placed within the room (e.g., at the corner of room, room boundary, and/or listening position) and the distance from each standalone marker to the master entered into the processor.

When Li-Fi communication is established among the speakers in the room 70, at block 408 in FIG. 4 the master device and/or CE device 12 and/or other device implements a location module according to the location determination references above, determining the number of speakers in the room 70 and their locations, and if desired presenting the speakers at the determined locations (along with the sound bar 310 and subwoofer 213) as shown at 314A-D in FIG. 3. The lines 316 shown in FIG. 3 illustrate communication among the speakers 310, 312, 314 and may or may not be presented in the UI of FIG. 3.

In an example "automatic" implementation discussed in greater detail below, a component in the system such as the master device or CE device 12 originates two-way Li-Fi ranging with the Li-Fi LEDs 68 of the fixed locations described above. Using the results of the ranging, range and direction to each speaker from the originating device are determined using triangulation and the distance-time-speed algorithm described above. If desired, multiple rounds of two-way ranging can be performed with the results averaged for greater accuracy.

The two way ranging described above may be effected by causing the CE device 12 (or other device acting as a master for purposes of speaker location determination) to receive a poll message from an anchor point. The CE device 12 sends a response message to the poll message. These messages can convey the identifications associated with each LED 68 or transmitter. In this way, the number of speakers can be known.

The polling anchor point may wait a predetermined period known to the CE device 12 and then send a final poll message to the CE device 12, which can then, knowing the predetermined period from receipt of its response message that the anchor point waited and the speed of the Li-Fi signals, and the time the final message was received, determine the range to the anchor point.

While FIGS. 3 and 4 are directed to finding the locations of the speakers in two dimensions, their heights (elevations) in the room 70 may also be determined for a three dimensional location output. The height of each speaker can be manually input by the user or determined using an altimeter associated with each speakers or determined by implementing a LED 68, e.g., the CE device 12 as three integrated circuits with respective LEDs distanced from each other by a known distances, enabling triangulation in three dimensions.

The primary listener location may be then determined according to discussion below. The number of speakers and their locations in the room are now known. Any speakers detected as above that lie outside the room may be ignored. A GUI may be presented on the CE device of the user showing the room and speakers therein and prompting the user to confirm the correctness of the determined locations and room dimensions.

Figure 5:
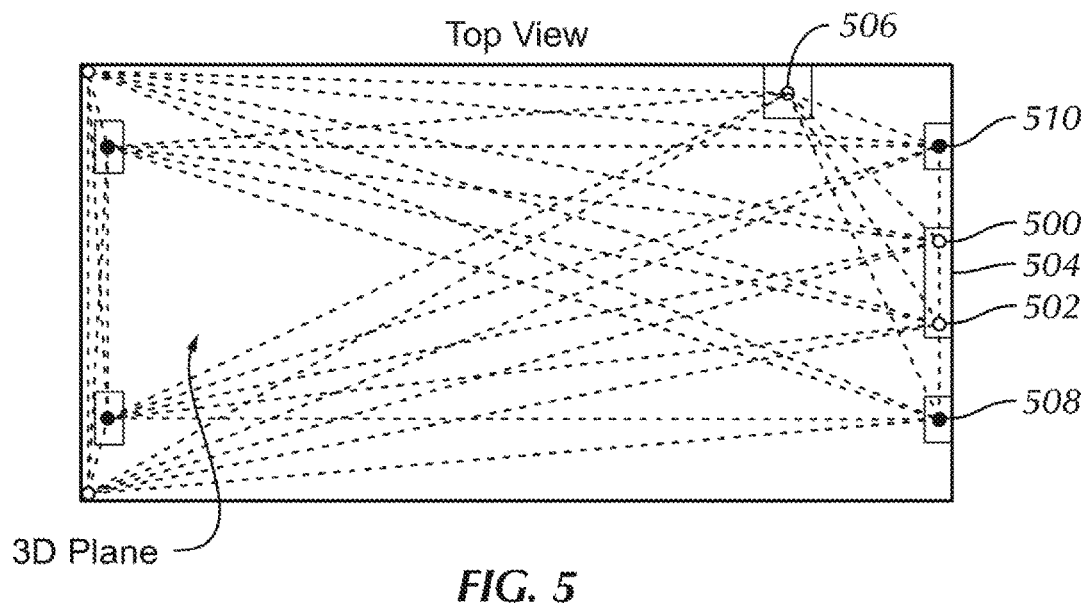
FIGS. 5-7 are additional screen shots of example UIs related to speaker location determination.
Figure 6:
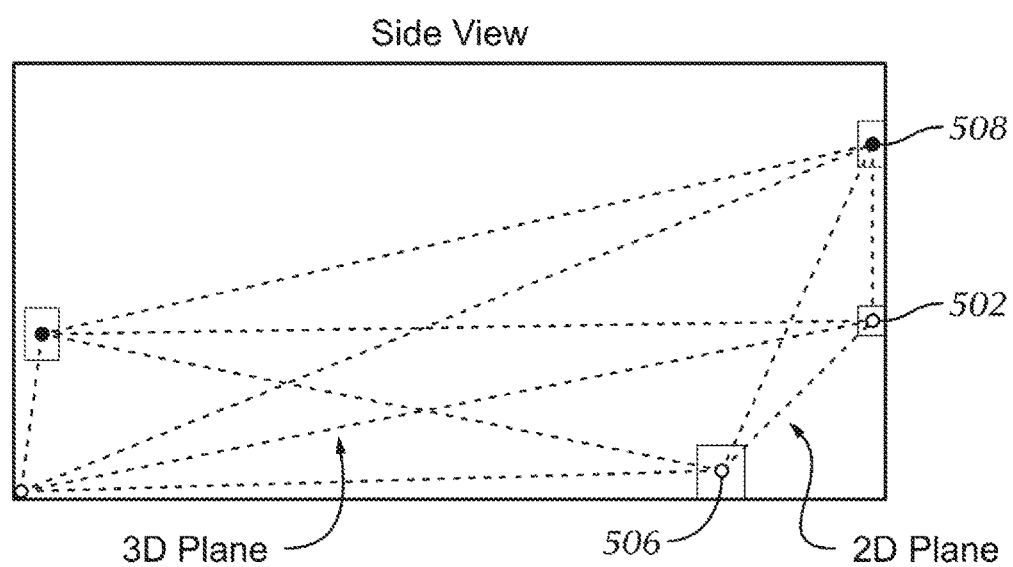

FIGS. 5 and 6 illustrate aspects of an implementation of the 3D location determination. These figures may be presented as UIs on the CE device 12. Four known locations are provided to determine the location of each speaker in three dimensions. In the example shown in FIG. 5, the user has input the locations 500, 502 associated with a sound bar/TV 504 and the location of the subwoofer 506. The user has also identified (e.g., by touching the display 14 of the CE device 12 at the appropriate locations) two corners 508, 510 of the room 70, preferably corners in which locators such as LEDs 68 have been positioned. Determination of the number of speakers and locations in 3D using triangulation discussed above and the techniques described in the above-referenced location determination references is then made. Note that while FIGS. 5 and 6 respectively show a top view and a side view of the room 70 on the display 14 in two separate images, a single 3D image composite may be presented.

Figure 7:
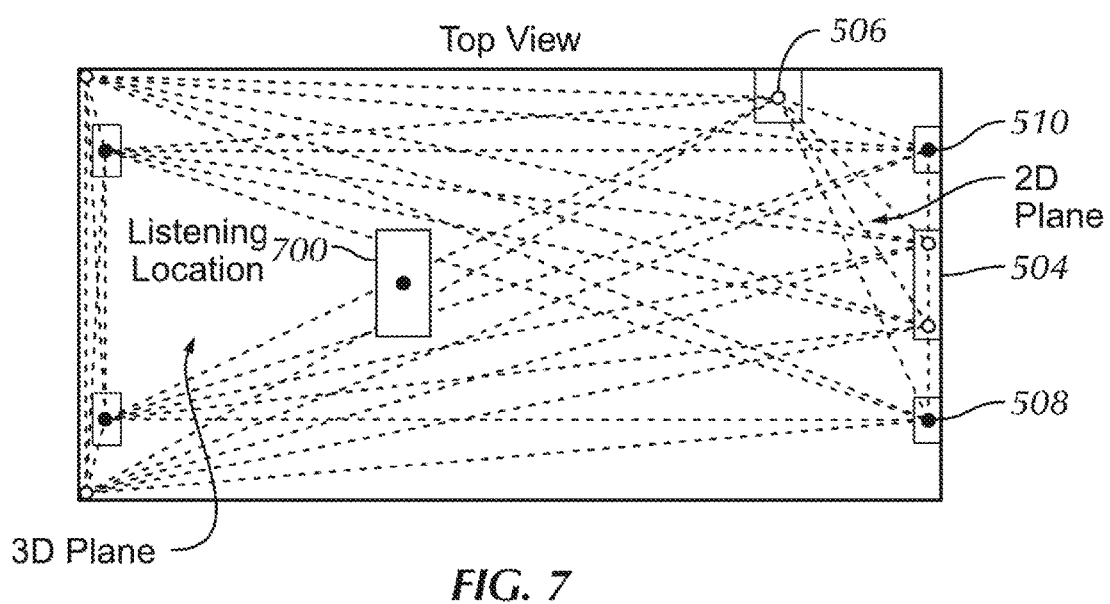

FIG. 7 illustrates yet another UI that can be presented on the CE device 12 in which the user has entered, at 700, the expected location of a listener in the room 700. Or, the location 700 can be automatically determined as described further below using Li-Fi transmissions. Yet again, for purposes of up-mixing according to the rendering references incorporated above, a default location may be assumed, e.g., the geometric center of the room 70, or alternatively about ⅔ of the distance from the front of the room (where the sound bar or TV is usually located) to the rear of the room.

Once the number and locations of the speakers are known, the up mixing at block 206 may be executed using the principles discussed in the above-referenced rendering documents. Specifically, the stereo audio (either as received stereo or resulting from down-mixing of non-stereo input audio at block 204) is up-mixed to, as an example, N.M audio, wherein M=number of subwoofers (typically one) and N=number of speakers other than the sub-woofer. As detailed in the rendering documents, the up-mixing uses the speaker locations in the room 70 to determine which of the "N" channels to assign to each of the respective N speakers, with the subwoofer channel being always assigned to the subwoofer. The listener location 700 shown in FIG. 7 can be used to further refine channel delay, EQ, and volume based on the speaker characteristics (parameters) to optimize the sound for the listener location.

One or more measurement microphones, such as may be established by the microphones 80 in FIG. 1, may be used if available to further calibrate the channel characteristics. This may be made based on information received from the individual speakers/CPU 50 indicating microphones are on the speakers, for example.

If measurement microphones are available, the user can be guided through a measurement routine. In one example, the user is guided to cause each individual speaker in the system to emit a test sound ("chirp") that the microphones 80 and/or microphone 18 of the CE device 12 detect and provide representative signals thereof to the processor or processors executing the logic, which, based on the test chirps, can adjust speaker parameters such as EQ, delays, and volume.

The example above uses a centralized master device to up-mix and render each of the "N" audio channels, sending those channels to the respective speakers. When wireless connections are used and bandwidth is limited, a distributed architecture may be used, in which the same stereo audio from a master is sent to each speaker, and each speaker renders, from the stereo audio, its own respective channel. Details of this alternative architecture are set forth in the above-referenced U.S. patent application Ser. No. 15/019,111.

Figure 8:
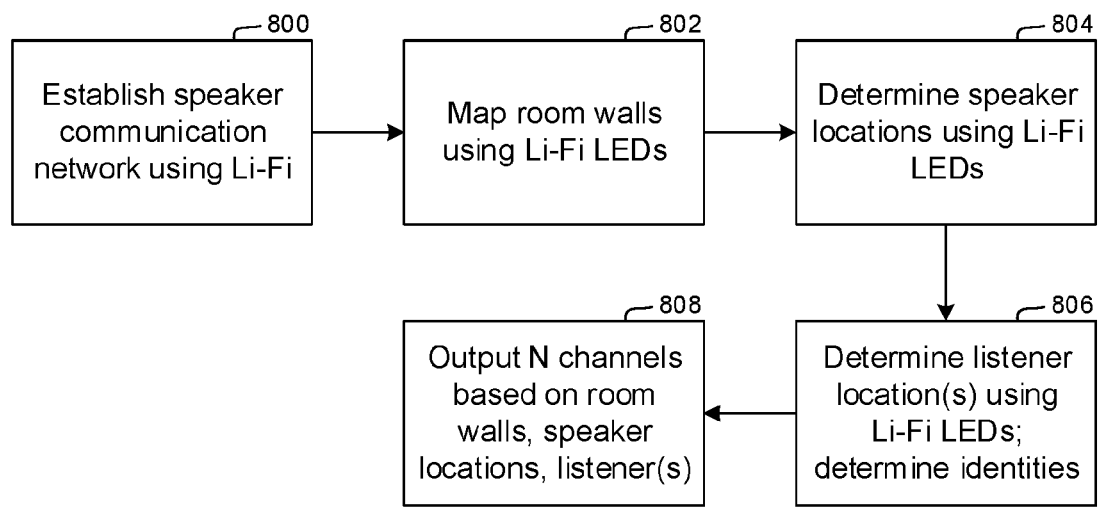
FIG. 8 is a flow chart illustrating logic for mapping a room using Li-Fi LEDs.

FIG. 8 illustrates overall logic for using the LED assemblies 68 for multiple purposes, additional details of which are disclosed in reference to FIGS. 9-16. Note that the logic described herein may be executed by any processor described herein and/or by any one or more of the processors described herein working in cooperation with each other.

At block 800, the LED assemblies 68 are used to establish Li-Fi communication in the speaker network shown in FIG. 1. To this end, each speaker may include its own LED assembly 68.

Proceeding to block 802, the walls of the enclosure 70 may be mapped or determined using the LEDs of one or more of the LED assemblies 68. Also or alternatively (e.g., when the wall locations are manually input by the user as described above), at block 804 the locations of the speakers in the enclosure 70 may be determined using LEDs of one or more of the LED assemblies 68. Also or alternatively (e.g., when the speaker and/or wall locations are manually input by the user as described above), at block 806 LEDs of one or more of the LED assemblies 68 are used to determine one or more locations of listeners in the enclosure 70. The identities of the detected listeners may also be determined. Proceeding to block 808, N-channel audio is output for play on the speakers in the enclosure 70 with configuration (EQs, delays, volume, e.g.) adjusted as appropriate to optimize acoustic wave interference at the location of at least one listener given the locations of the walls and speakers in the enclosure 70.

Figure 9:
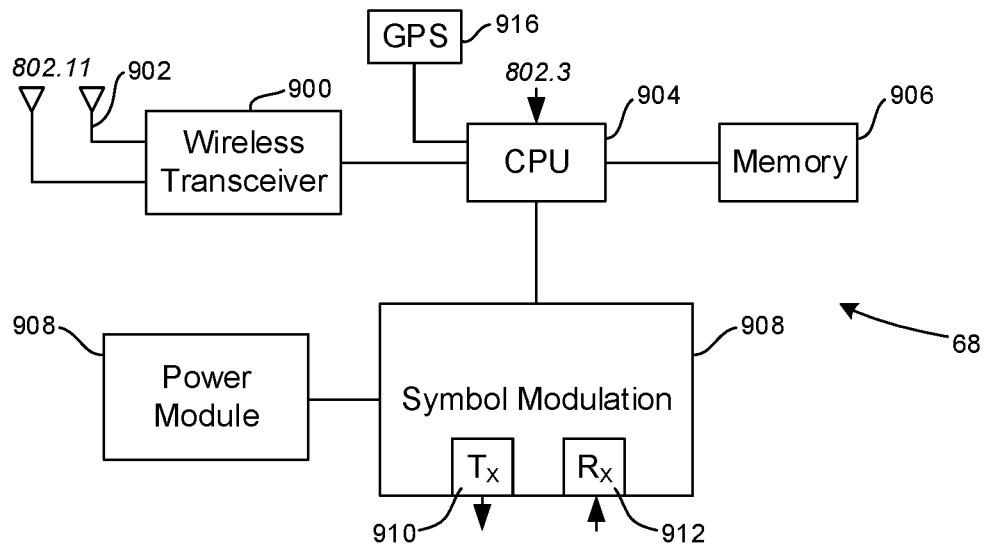
FIG. 9 is a block diagram of an example Li-Fi transmitter/receiver.

FIG. 9 shows an example LED assembly 68, which may be incorporated into the chassis of a respective speaker or housed in a module housing separate from the speaker and mounted to or otherwise associated with the speaker for wired and/or wireless communication between the module and the processing components of the speaker. A wireless transceiver 900 may be employed to send and receive, e.g., IEEE 802.11 signals (such as Wi-Fi) over respective antennae 902. The transceiver 900 may communicate with one or more assembly processors 904, which may also communicate with a wired Ethernet (IEEE 802.3). The assembly processor 904 can access one or more assembly memories 906 such as disk-based or solid state storage to access instructions contained therein for executing logic according to present principles.

A symbol modulator 908 may be controlled by the assembly processor 904 to output Li-Fi communication symbols through a Li-Fi transmitter 910, which may be implemented by one or more LED. Li-Fi and other light signals may be received by a receiver 912 such as a photodiode and provided through the modulator 908 to the assembly processor 904. A power module 914 such as a battery or ac-dc converter may provide power to appropriate components of the LED assembly 68, and a position sensor 916 such as but not limited to a global positioning satellite (GPS) sensor may provide location information to the assembly processor 904. In this example, by means of the GPS information, each LED assembly 68 may know its location and may signal that location, as well as the below-described detected wall, speaker, and listener locations relative to the respective LED assembly location, to other LED assemblies in the enclosure 70.

Because an LED assembly may include Wi-Fi or Ethernet capability, speaker networks in different enclosures can communicate with each other.

Figure 10:
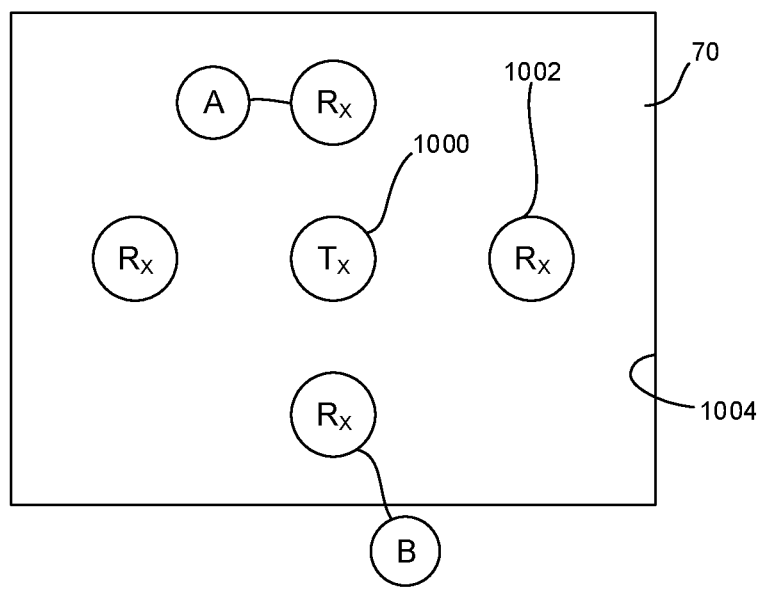
FIGS. 10-12 are schematic diagrams showing respective example Li-Fi transmitter/receiver layouts in a room.

FIG. 10 illustrates a simplified example configuration of LED assemblies for purposes of mapping the walls, speakers, and listeners in the enclosure 70. A transmitting LED assembly 1000 may be centrally located in the enclosure on a speaker, or the ceiling, or floor of the enclosure, and multiple LED assemblies 1002 (four shown) positioned on speakers or elsewhere in the enclosure 70 to act as receivers of reflections of light from the transmitter assembly 1000. The reflections may be from the walls 1004 of the enclosure as shown. It is to be understood that additional receiver assemblies 1002 may be positioned near the ceiling and floor of the enclosure to also map these surfaces for 3D applications, with the same principles discussed below applying to determining the ceiling and floor locations.

In the example of FIG. 10, the transmitter assembly 1000 may transmit one or more measurement light beams from its LED. Each receiver may receive the transmitted light and assume that is has been received at an initial receipt time to that is prior to any reflection. The next LED light received by the receiver at time $t_1$ may be assumed to be a reflection from the wall closest to the receiver. To determine the distance from the receiver to the closest wall, the following equation may be used:

$$D=c(t_1-t_0)$$

where c=speed of light.

It may then be assumed that for each receiver, the distance to the wall closest to that receiver as determined above is a midpoint of a projected planar surface. The midpoints may be communicated to a determination processor (which may be implemented by any of the processors herein) which projects respective planes from each midpoint. The projected planar surfaces will intersect each other with the intersections defining the corners of the enclosure 70 and the portions of the projected planes within the corners defining the walls of the enclosure.

The above is but one simplified method for mapping the wall locations of the enclosure 70. More complex methods may be used. For example, the process above can be repeated multiple times to refine the wall locations. Additional reflections after time ti at each receiver may also be used to ascertain whether a receiver's initial reflection is indeed from a wall or from an intervening object. Or, the transmitting assembly 1000 may be mounted on a gimbal to send multiple transmissions at multiple orientations such that the reflections detected by the receivers at some orientations may be received sooner than reflections received at other orientations, with the further reflection being assumed to be a wall and the earlier reflection assumed to be from an intervening object between the receiver and wall. Instead of a gimbal to steer the transmitting assembly 1000, a microelectrical mechanical system (MEMS) may be used.

Yet again, in embodiments in which each LED assembly knows its location and the locations of other assemblies by virtue of GPS information being communicated between the assemblies or by other means (e.g., manual location entry by an installer), the locations of the assemblies may be used in the computation of wall locations to ferret out false indications of wall locations arising from reflections from intervening objects. Yet again, it may be assumed, for the same purpose that each receiver is more or less at the same distance from its closest wall as the opposite receiver. Looking at FIG. 10, it may be assumed that receivers A and B are about the same distance away from their respective walls as each other. If receiver A indicates a distance of less than a threshold fraction of the distance indicated by receiver B, it may be inferred that the distance reported by receiver A is to an intervening object between it and its nearest wall, and the location of its nearest wall will therefore be given by the time of receipt of a second reflection that more closely approximates the distance reported by the receiver B.

Figure 11:
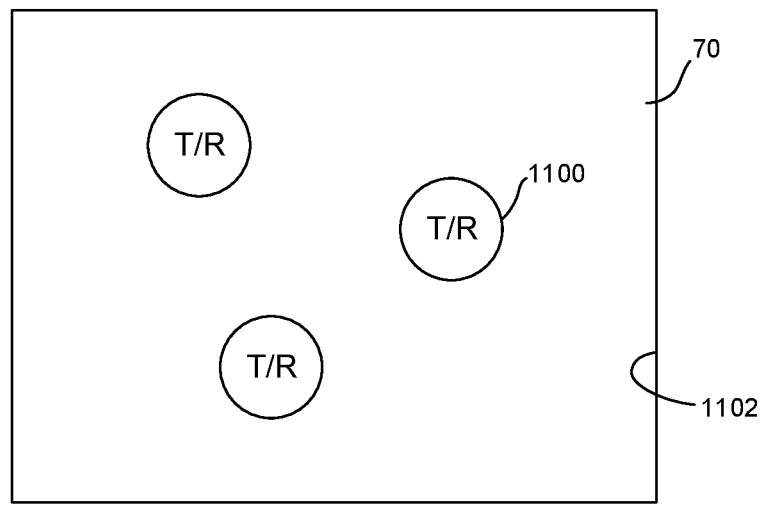

FIG. 11 illustrates an alternative configuration in which plural LED assemblies 1100 may be used to map walls 1102 of the enclosure 70. The assemblies 1100 may communicate with each other using Li-Fi to cooperate to allow one assembly to transmit a wall detection signal and determine the wall closest to it according to principles above with the other assemblies remaining quiescent. When an assembly has concluded its logic the next assembly may be activated to determine the location of the wall closest to it, and so on.

Figure 12:
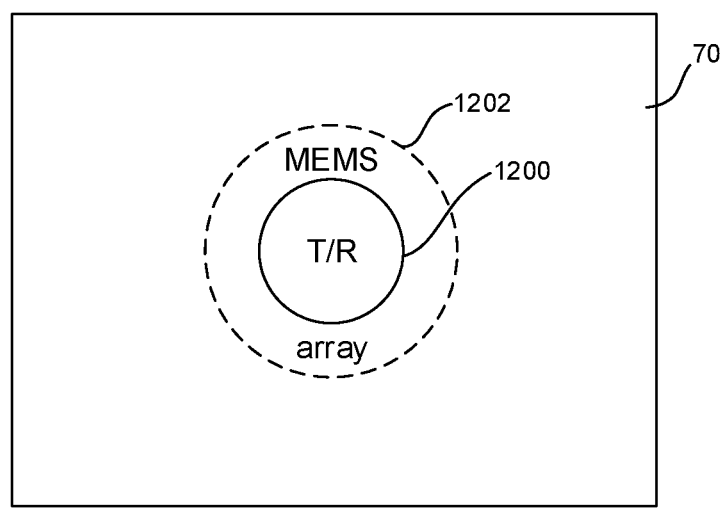

FIG. 12 illustrates yet a third non-limiting example in which a single LED assembly 1200 may be centrally located and may be combined with a MEMS array 1202 to steer a sequence of light beams around the enclosure, with each reflection detected by the receiver of the LED assembly being used as an indication of a wall whose distance from the LED assembly 1202 is given according to the equation above.

It is to be understood that in mapping the walls as described above, the process may be simplified by instructing the installer to mount the LED assemblies prior to filling the enclosure with speakers or other intervening objects and execute the described logic. In that way the process is simplified as all reflections must come from the walls/ceiling/floor of the enclosure and not from other objects. Or, each speaker may be equipped with a tag or reflector whose reflection indicates a special reflector and, hence, a speaker, to discriminate reflections from speakers from reflections from walls. The opposite approach may be taken, i.e., the special reflectors with characteristic or unique reflection properties may be mounted on the walls. In this way, the reflections obtained by any of the configurations in FIGS. 10-12 can be used to map both speakers and walls simply by discriminating between reflections from the tags and reflections from untagged surfaces. Such discrimination may be effected by amplitude discrimination, with tagged reflectors being better reflectors than untagged surfaces.

Yet again, a combination of manual and automatic mapping may be used. For instance, a user may be presented with a UI such as those described above to indicate the locations of the walls of the enclosure, with subsequent reflections determined to have come from the walls based on the known locations of the LED assemblies being ignored and other reflections being inferred to be from intervening objects such as listeners or audio speakers. Similarly, the user may use a touch display to touch a presentation of an estimated model of the enclosure to indicate where audio speakers and/or listeners are, with reflections from those locations being ignored by the LED assemblies and other reflections inferred to be from the walls, thereby refining the map of the enclosure.

Figure 13:
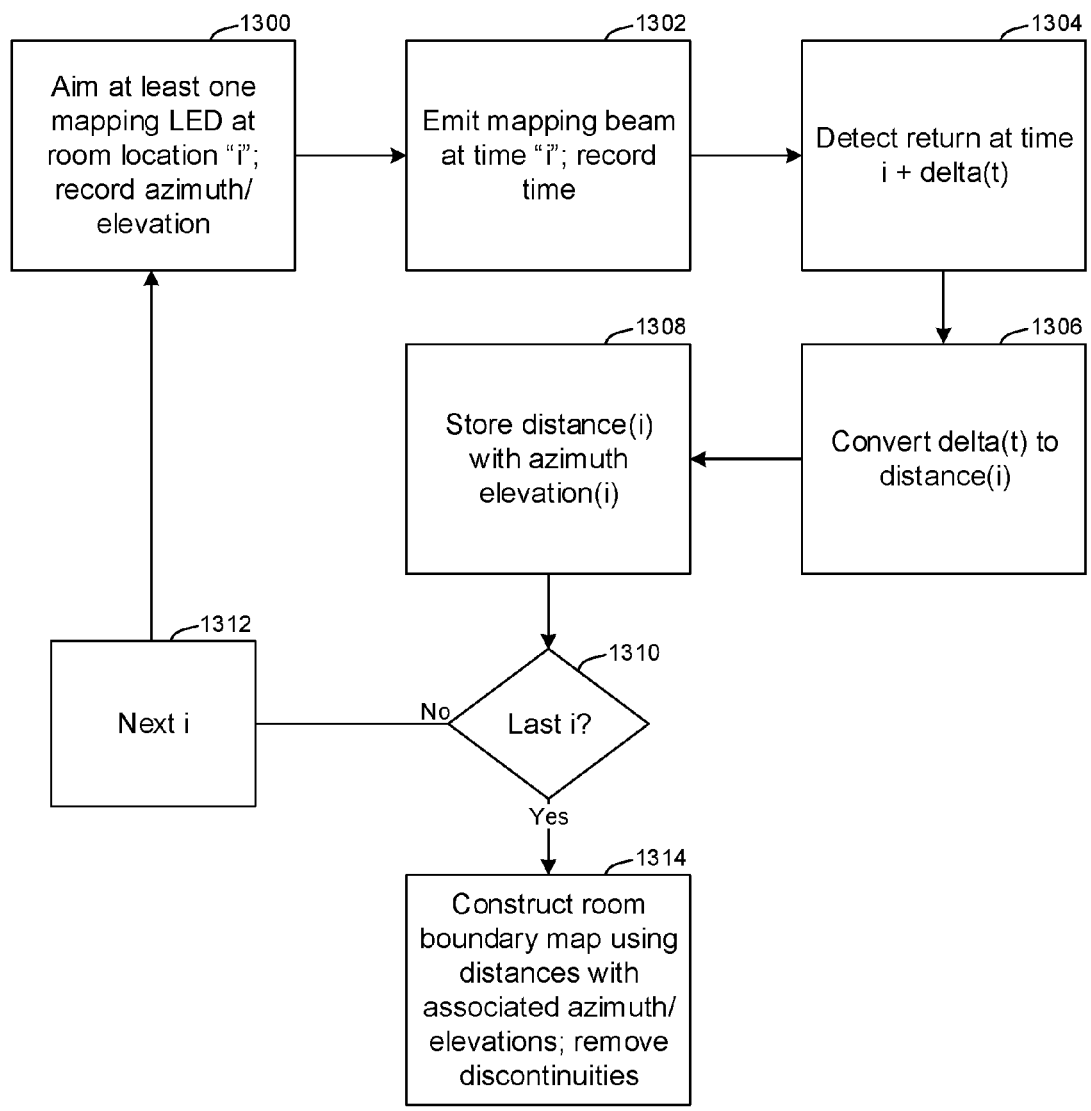
FIG. 13 is a flow chart of example logic for mapping a room using LED transmissions from the Li-Fi LEDs.

FIG. 13 illustrates logic for mapping a room in which any of the LED assembly configurations described above may be disposed. Commencing at block 1300, at least one of the LEDs may be oriented in azimuth and elevation at an $i^{th}$ orientation. The orientation of the LED is recorded. Proceeding to block 1302, the LED is controlled to emit a mapping pulse of light at time "i". The time "i" is recorded. If desired, multiple LEDs in respective orientations may emit respective test pulses at respective different visible frequencies at time "i", with the differences in frequencies of the return reflections being used to discriminate one pulse from another. However, for clarity the disclosure below focuses on the processing of a signal for one LED assembly.

Proceeding to block 1304, a light receiver, which may be substantially co-located with the emitting LED, receives a return signal representing the reflection of the test pulse from a surface against which the test pulse impinges. The surface may be assumed to be a wall of the room in which the system is disposed, but as discussed elsewhere herein, the logic can account for the possibility that the surface is something other than a wall of the room, e.g., is furniture or a speaker or a person in the room. The signal from the receiver is sent to an appropriate one of the above-described processors, for example, which records the time the return reflection was received. The difference $\Delta t$ between time of return detection and time "i" of pulse transmission is determined and at block 1106 converted to an $i^{th}$ distance using, for example, the following algorithm:

$$i^{th}\ \text{distance}=\tfrac{1}{2}\Delta t * c,\ \text{where c=speed of light.}$$

At block 1308 the i$^{th}$ distance is stored and associated with the orientation (azimuth and elevation angle of the sonic axis) of the emitting LED. Moving to decision diamond 1310, it is determined whether any further measurements are to be taken. In an example, 100 mapping measurements be taken (i.e., "i" increases monotonically from one to one hundred). More or fewer measurements may be used. If more measurements are to be taken, the process moves to block 1312 to the next "i", in which a different elevation and/or azimuth of the LED is used or in which another LED in a system of fixed LEDs of differing orientations is used and then the process loops to block 1300.

When all measurements have been taken, the process exits decision diamond 1310 to block 1314 to construct a map of the room. To do this, walls are assumed to be located at respective distances "i" from the location of the emitting LED and/or light receiver along the respective i$^{th}$ orientations. The walls are assumed to form a regular enclosure, so that any discontinuities such as a relatively short distance recorded between two relatively longer and equal distances can be removed from the map on the assumption that such discontinuities are not walls but rather caused by an artifact such as an intervening piece of furniture or false return.

Figure 14:
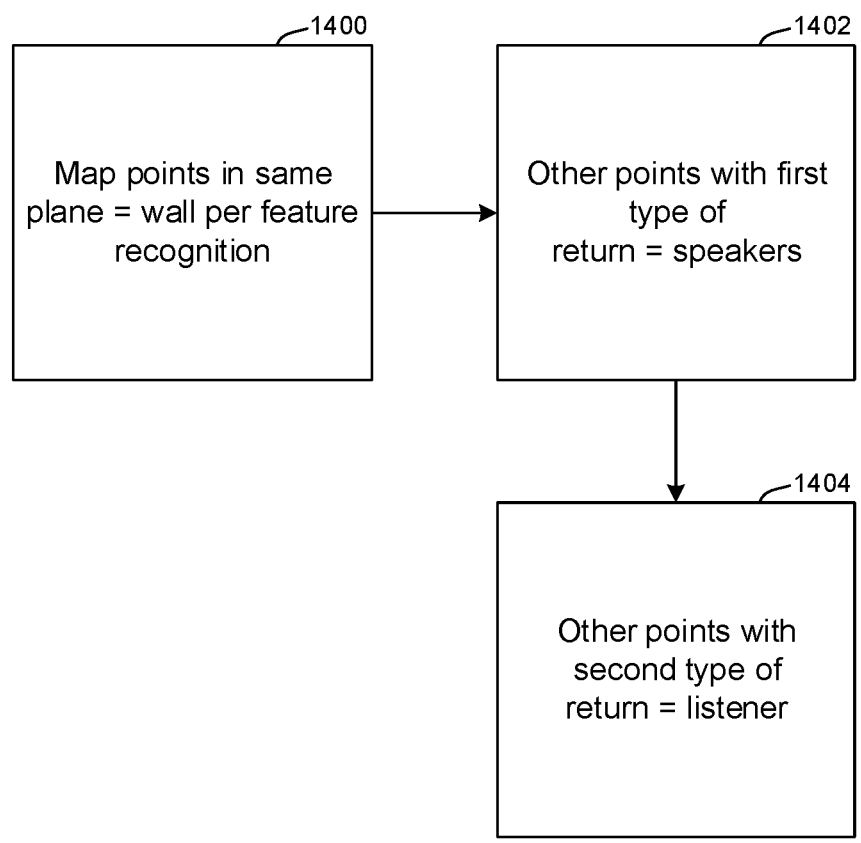
FIG. 14 is a flow chart of example logic for multiple uses of Li-Fi LEDs.

FIG. 14 shows additional logic that may be employed, again executed by any one or more of the processing components divulged herein. Commencing at block 140, reflections indicating locations in the same flat plane, potentially satisfying a size criteria that discriminates between larger walls and smaller rectangular objects, are mapped as walls of the enclosure. That is, feature recognition may be used to recognize that a series of reflections at a given receiver or receivers all lie in the same plane, and that the plane is sufficiently large to be inferred to be a wall. In addition or alternatively, the feature recognition may be based on the type of reflection received. For example, it may be assumed that a strong reflection (higher amplitude) comes from a hard speaker surface, whereas a less strong reflection comes from a matte-painted wall. Other feature vectors may be used.

Once the walls are mapped, the logic can move to block 1402, wherein other points of reflection with a first type of return signal characteristic are mapped as audio speaker locations. The first type of return signal characteristic may be, as discussed above, an exceptionally high amplitude as may be reflected by reflectors or tags engaged with the audio speakers. In contrast, at block 1404 other points of reflection with a second type of return signal characteristic are mapped as human listener locations. The second type of return signal characteristic may be a relatively low amplitude reflection signal as may be produced by a surface such as human skin that is softer than an audio speaker or a wall.

Figure 15:
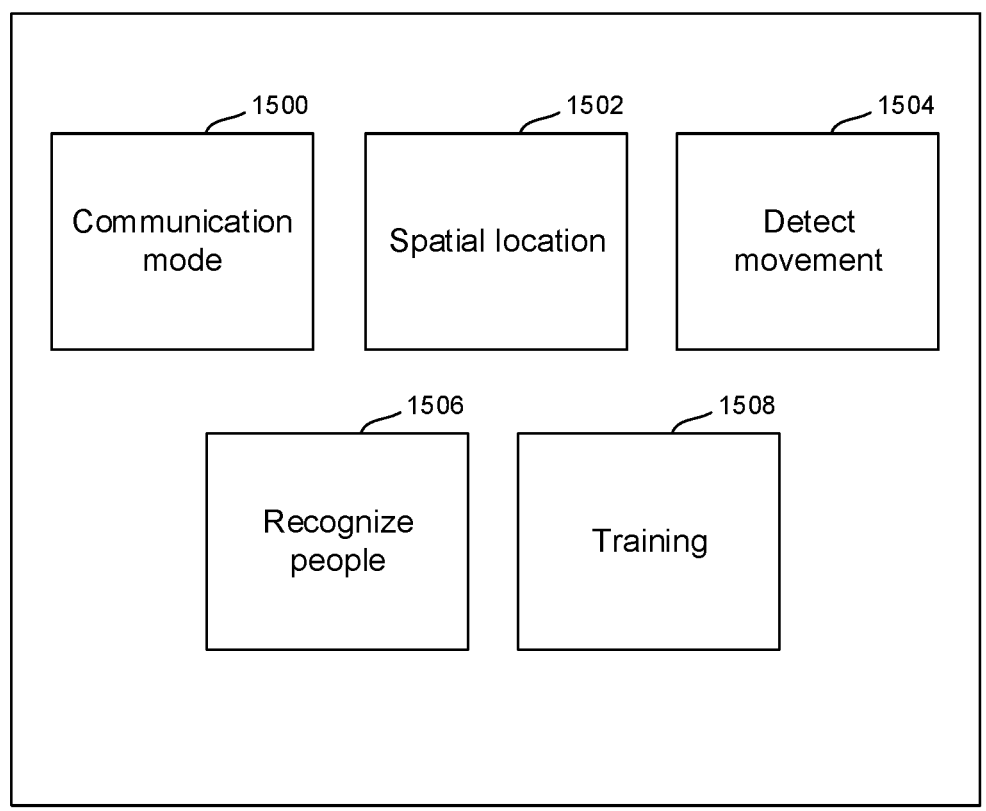
FIG. 15 shows a state diagram of various system modes as may be presented on a user interface (UI)

FIG. 15 illustrates a state diagram of various system modes that may be presented as a UI on any of the displays described herein. A communication mode selector 1500 may be selected to cause the LED assemblies to function as communication devices using Li-Fi. A spatial location mode selector 1502 may be selected to cause the LED assemblies to enter any of the room mapping modes described earlier.

A motion detector mode selector 1504 may be selected to cause the LED assemblies to act as motion detectors, outputting signals indicating motion and, hence, a need for mapping possible new spatial locations of objects such as people or moved audio speakers. In the motion detector mode, the LED assemblies periodically (e.g., every few milliseconds) emit pulses and differences in reflection locations from time (1) to time (2) indicate that a reflecting surface has moved between time (1) and time (2). Also, the motion detection mode can be used to establish a low power setting for one or more components in the speaker system when no motion is detected, and to wake up and power up those components upon detecting motion. Speaker location can be re-executed upon detecting motion.

A person recognition mode selector 1506 may be selectable to enter a recognition mode, in which a person previously classified can be recognized based on matching a signal from a wearable person-specific Internet of Things device as being co-located with LED reflections from an object in the room. Or, a training mode selector 1508 may be selected to enter a training mode in which, for example, an image of an unrecognized person is presented on the display and the user is asked to identify the user, as described below. Once the person has been identified, the identity is correlated to future reflection patterns matching the reflection pattern of the particular previously unidentified listener (object having the second type of return characteristic in terms of FIG. 14). Each identified listener may be associated with a personalized speaker configuration profile. Yet again, in the recognition mode an object classified as a person according to principles above may be recognized by virtue of imaging the object with a camera or microphone and performing facial recognition or voice recognition to correlate the recognized listener object with an identity.

Figure 16:
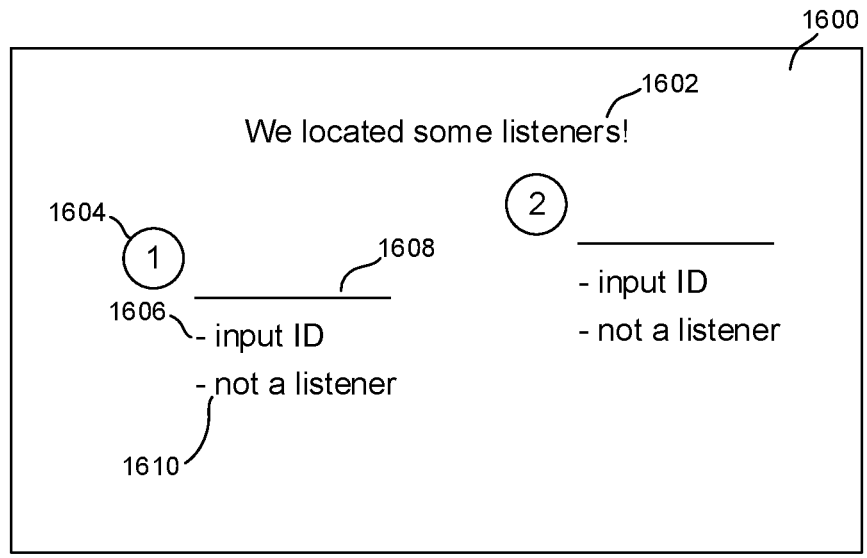
FIG. 16 is a screen shot of an example UI for the training mode.

FIG. 16 illustrates an example of this last aspect of the training mode. A UI 1600 may be presented on a display and may prompt 1602 that human listeners have been located as described above. In the example shown, two listeners 1604 with their approximate locations in the room are depicted, with a prompt 1606 indicating to input the identity of a user into a field 1608. In the event that the detected object is not a listener but rather something else, the user can so indicate by selecting "not a listener" selector 1610, in which case the system may reclassify the object as, e.g., an audio speaker.

It will now be appreciated that the present disclosure divulges optical location (2D and 3D) for a single room and for whole home applications using Light Fidelity (Li-Fi) LEDs. Li-Fi is a bidirectional, high-speed and fully networked wireless communication technology similar to Wi-Fi. Li-Fi technology enables Wi-Fi-like networking capability via strobing LEDs. In addition to the visible light communication, an LED is used to determine the location of objects in a room, as well as identify specific objects (or people) of priority.

Network-enabled LED's may be used to detect the size and shape of a room, to detect specific objects in a room (i.e., speakers, people, etc.), to detect how many people are in a room, as well as who they are. Through networking and computation, all the room sizes and shapes within a home can be known and mapped, specific contents in each room can be known, as well as where, who and how many people are in a home.

In some implementations at least two or more networked LED's are provided per room, with at least two or more networked LEDs near the ceiling and another two or more LEDs at a lower elevation (i.e., side wall or standard lamp fixture). The different elevations aid in getting the best room coverage (no blind spots), as well as getting a good 3D map (x, y, z) and localization of priority items (i.e., network speakers, people, etc.).

While the particular NETWORKED SPEAKER SYSTEM WITH LED-BASED WIRELESS COMMUNICATION AND ROOM MAPPING is herein shown and described in detail, it is to be understood that the subject matter which is encompassed by the present invention is limited only by the claims.

What is claimed is:

1. A device comprising:
at least one computer medium that is not a transitory signal and that comprises instructions executable by at least one processor to:
control at least a first light emitting diode (LED) associated with at least a first audio speaker assembly to communicate with at least a second audio speaker assembly using bidirectional strobing communication;
control the first LED to emit a detection signal detectable by at least one receiver, at least one processor communicating with the at least one receiver to receive indication of the detection signal therefrom and based on the indication of the detection signal, determining a location of at least one point on at least one wall of an enclosure in which the first audio speaker assembly is located;
determine plural time differences between respective times of receipt of plural received returns from respective return locations of respective detection signals, and respective transmission times of the respective detection signals;
correlate the plural time differences to corresponding distances;
output a wall location based on a determination that at least some of the plural distances indicate return locations lying in a common plane; and
refine the wall location based on multiple rounds of detection signals.

2. The device of claim 1, wherein the device is integral to the first speaker assembly.

3. The device of claim 1, wherein the device is disposed in a module separate from the first speaker assembly and configured for association with the first speaker assembly.

4. The device of claim 1, comprising the processor.

5. The device of claim 1, comprising the first LED.

6. The device of claim 1, comprising the receiver.

7. The device of claim 1, wherein the instructions are executable to:
based at least in part on the wall location, establish at least one audio setting of at least one of the audio speaker assemblies.

8. A method, comprising:
using at least a first light emitter to communicate with a receiver using a bidirectional networked wireless communication protocol having signaling produced by strobing light emitting diodes (LED);
using light from at least some of the LEDs to detect at least a first wall in an enclosure in which the light emitter is located;
based at least in part on a location of the wall, establish at least one audio setting of at least one audio speaker assembly; and
using light from at least some of the LEDs to detect at least a first wall in an enclosure in which the light emitter is located at least in part by:
identifying location information of at least some of the LEDs;
executing computation of wall locations to identity false indications of wall locations arising from reflections from intervening objects at least in part using the location information.

9. The method of claim 8, comprising using the first light emitter to communicate with at least one audio speaker in a network of speaker assemblies.

10. The method of claim 9, comprising associating the light emitter with at least a second audio speaker in the network of speaker assemblies.

11. The method of claim 10, comprising integrating the first light emitter into the second audio speaker.

12. The method of claim 10, comprising integrating the first light emitter into a module separate from and associable with the second audio speaker.

13. The method of claim 9, comprising:
determining plural time differences between respective times of receipt of plural received returns from respective return locations of respective detection signals, and respective transmission times of the respective detection signals;
correlating the plural time differences to corresponding distances; and
outputting a wall location based on at least some of the plural distances indicating return locations lying in a common plane.

14. A system, comprising:
plural audio speakers at least some of which are associated with respective light emitting diode (LED) assemblies for communicating data between at least some of the audio speakers using bidirectional strobing communication; and
at least one processor configured for:
determining, using reflections of signals from at least a first one of the LED assemblies, a location of at least one wall of an enclosure in which at least some of the audio speakers are located;
based at least in part on the location of the at least one wall, establishing at least one setting of at least one of the audio speakers;
identifying a location of at least a first LED assembly to be at a same distance from a first wall as a second LED assembly is from a second wall; and
responsive to identifying that the first LED assembly indicates a distance of less than a first fraction of the distance indicated by the second LED assembly, identifying that the distance reported by the first LED assembly is to an intervening object between the first LED assembly and the first wall.

15. The system of claim 14, wherein the processor is integral to at least one of the audio speakers.

16. The system of claim 14, wherein the processor is disposed in a module separate from the audio speakers and associable with at least a first one of the audio speakers.

17. The system of claim 14, wherein the processor is configured with instructions executable to:
determine plural time differences between respective times of receipt of plural received returns from respective return locations of respective detection signals, and respective transmission times of the respective detection signals;
correlate the plural time differences to corresponding distances; and
output the location of the at least one wall based on at least some of the plural distances indicating return locations lying in a common plane.

* * * * *